April 24, 1951 C. GIRARDI 2,550,412

ROCKABLE MOUNT FOR BREAKBACK MOWERS

Filed June 30, 1948 5 Sheets-Sheet 1

INVENTOR
CHESTER GIRARDI
BY [signature]
ATTORNEYS

ROCKABLE MOUNT FOR BREAKBACK MOWERS

INVENTOR
CHESTER GIRARDI
BY [signature]
ATTORNEYS

April 24, 1951 C. GIRARDI 2,550,412

ROCKABLE MOUNT FOR BREAKBACK MOWERS

Filed June 30, 1948 5 Sheets-Sheet 3

INVENTOR
CHESTER GIRARDI

BY [signature]

ATTORNEYS

INVENTOR
CHESTER GIRARDI
BY [signature]
ATTORNEYS

INVENTOR
CHESTER GIRARDI
BY [signature]
ATTORNEYS

Patented Apr. 24, 1951

2,550,412

UNITED STATES PATENT OFFICE 2,550,412

ROCKABLE MOUNT FOR BREAKBACK MOWERS

Chester Girardi, Newton, Wis., assignor to H. G. & S. Manufacturing Corp., Newton, Wis., a corporation Application June 30, 1948, Serial No. 36,110

2 Claims. (Cl. 56—25)

This invention appertains to mower attachments for tractors, and more particularly to mower attachments of the general type shown in the Hansen Patent 2,335,510, granted November 30, 1943.

One of the primary objects of the present invention is to provide a novel main frame for the cutter bar and novel means for supporting the main frame from the tractor, whereby the frame and cutter bar will have a full floating action on the tractor, and whereby the entire attachment through a three point hook up can be quickly and easily connected to or removed from the tractor as a unit.

Another object of the invention is to provide a supporting A frame for the main frame rockably carried by the lift arms of the tractor hitch with a novel spring support for the main frame for insuring the desired floating action of the main frame and cutter bar on the structure.

Another salient object of the invention is the provision of a supporting yoke for the cutter bar carried by one end of the main frame, so that any movement of the yoke will be governed by the full movement of the main frame and thereby effectively minimize the number of wearing parts between the main frame and the cutter bar.

A further object of my invention is the provision of means for rockably mounting the main frame at the end thereof opposite to the end carrying the cutter bar, so that the main frame and cutter bar can swing rearwardly in a horizontal plane in case the cutter bar strikes a solid object, a novel spring loaded safety ball release being provided for holding the main frame and cutter bar in their normal operative position.

A further important object of the invention is to provide novel means for automatically raising the cutter bar to an inoperative position above the ground upon the raising of the unit to an inoperative travelling position on the tractor.

A still further object of the invention is to provide means for automatically disconnecting the drive to the cutter bar upon the raising of the cutter bar to an inoperative position, said drive disconnecting means operating in conjunction with a slip clutch, which acts to prevent injury to the cutter bar in case the finger and teeth of the cutter bar strike a solid object.

A still further object of the invention is to provide a novel combination supporting leg and guard for the main frame disposed in spaced relation to the cutter bar shoe, so that when the attachment is disconnected from the tractor the leg will function to support the attachment and to prevent injury to the drive and to the shield therefor.

A still further object of the invention is to provide novel stabilizing chains, between certain parts of the attachment to prevent swaying and lateral shifting of the unit, when the attachment is in use.

A still further important object of the invention is to provide a mower attachment for tractors, which will be of an extremely rugged construction, but one which will be light in weight and one which can be placed upon the market at a reasonable price.

With these and other objects in view, the invention consists in the novel construction, arrangement and formation of parts, as will be hereinafter more specifically described and claimed, and illustrated in the accompanying drawings, in which drawings:

Referring to the drawings in detail, wherein similar reference characters designate corresponding parts throughout the several views, the letter A generally indicates the improved mower attachment for a tractor T.

Figure 1:
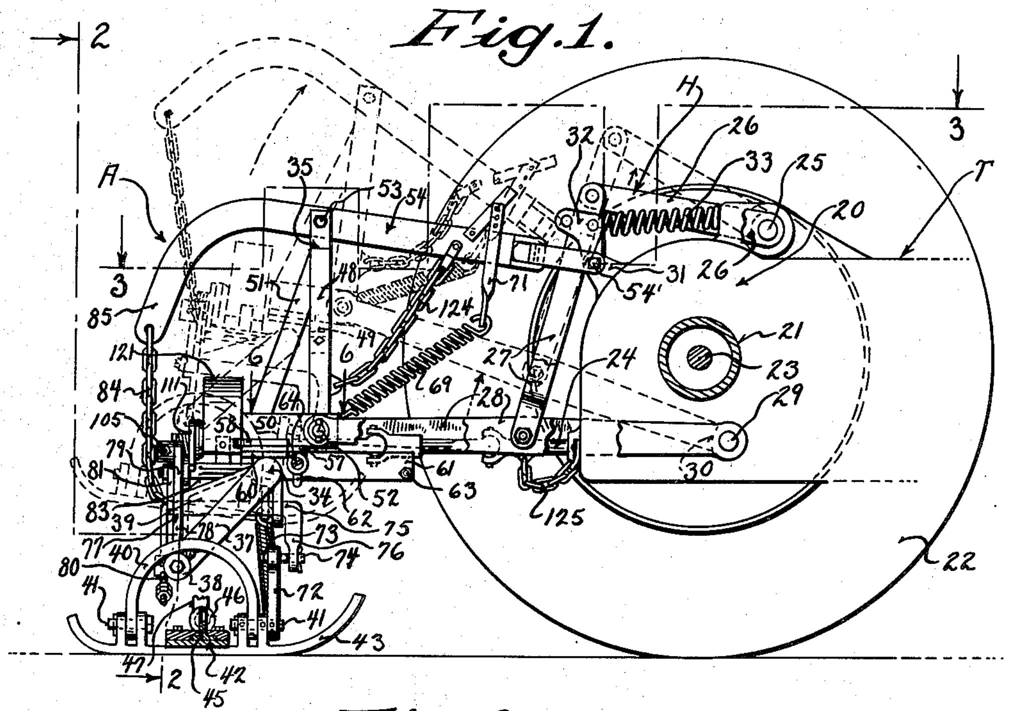
Figure 1 is a side elevational view, showing the novel mower attachment connected to a tractor, parts of the figure being shown broken away and in section, the parts in section being taken substantially on the line 1—1 of Figure 3, looking in the direction of the arrows.

Connected to the tractor T is a hydraulic implement hitch H, which carries the mower attachment A.

The tractor T, is of a well known type now found on the open market and the hitch H is also of a well known type employed to a large extent with the tractor T. As the tractor T is of a well known type, the same will not be described in detail, but it is to be noted that the tractor includes a differential housing 20, and laterally extending axle housings 21. The rear wheels 22 of the tractor are carried by axle shafts 23, which extend through the axle housings 21 and into the differential housing 20. The differential housing or casing 20 is provided with a power take-off and I have shown a power take-off shaft 24 extending outward from the housing 20.

As the implement or tractor hitch is also of a well known type, as set out above, the same will not be described in detail. However, the hitch H is built on a part of the differential housing 20, and includes a lift shaft 25 connected with the hydraulic operating mechanism (not shown). The lift shaft 25 is provided with lift arms 26 and the outer ends of the arms have pivotally connected thereto lift links 27. The lower ends of the lift links 27 are pivotally connected to the draw bars 28 of the hitch. The forward ends of the draw bars 28 are pivotally connected, as at 29, to lugs 30 on the tractor. By operating the hydraulic lift mechanism, the draw bars 28 can be raised and lowered. In rear of the lift shaft 25, the tractor is provided with a hitch part consisting of a centrally disposed lug 31, a lever 32 and a shock absorbing spring 33.

The novel mower attachment A is connected with the hitch and tractor primarily at three points only, namely, with the outer ends of the draw bars 28 and the central lug 31.

The novel mower attachment A includes a rugged main frame 34 and a rugged supporting A frame 35.

The main frame 34 is preferably of a tubular construction for lightness and strength, and consists of a straight portion 36, which extends transversely across the tractor. One end, namely, the outer end, is provided with a down turned arcuate portion 37 terminating in a laterally extending, straight tubular supporting arm 38. The main frame can be braced at various desired points by brace plates or webs 39 and these webs can be welded to the tubes forming the main part of the frame. The arm 38 has securely welded thereto a depending, inverted U shaped yoke 40. The lower ends of the arms of the yoke 40 carry pivots 41, which rockably support the mower or cutter bar 42. It is to be noted at this point that the inner end of the cutter bar, directly below the yoke 40, carries the supporting shoe 43. The outer end of the mower bar (not shown), can also be provided with the usual guards. The mower or cutter bar 42 is of the general type now in common use and hence includes the stationary finger bar 44 and reciprocating knife 45. The blade 45 is reciprocated through the novel operating mechanism, which will be set forth later, but it is to be noted that the inner end of the blade has connected thereto through a ball and socket joint 46, a pitman rod 47.

The supporting A frame 35 includes downwardly diverging main bracket plates or legs 48. These legs 48 are rigidly connected and braced intermediate their ends by a cross bar 49. Firmly welded, or otherwise secured to the lower ends of the legs 48 are a pair of spaced, parallel, side frame plates 50, and 50'. These plates 50 and 50' extend rearwardly from the legs 48 and brace bars 51 can be employed for rigidly connecting the rear ends of the frame plates 50 and 50' with the legs 48, adjacent to the upper ends thereof. The forward ends of the frame plates 50 and 50' adjacent to the lower ends of the legs 48 are provided with outwardly extending pivot pins 52 and these pins constitute stub shafts and are rockably received in the tractor draw bars 28. Hence the A frame is rockably carried directly by the draw bars and moves with the draw bars. The upper ends of the draw bars rockably support, upon a pivot pin 53, an operating lever 54 and this lever has its forward end connected by means of a pivot bolt 54' to the central lug 31 on the tractor. The lever 54 and its function will be later set forth in detail, but from the description so far, it can be seen that the A frame 35 is connected to the tractor and its hitch at three points.

The frame plate 50' has welded or otherwise rigidly secured thereto a depending pivot pin 55. This pivot pin 55 extends vertically through the straight portion 36 of the frame 34, adjacent to the inner end thereof, so that the frame 34 can swing on the A frame 35 in a horizontal plane. The lower end of the pivot pin can carry a bearing collar 55' and the upper face of the frame 34 can carry a bearing washer 56, which can be welded to the upper face of the frame.

The frame plate 50 has welded to its lower face, a wedge shaped guide plate 57. This wedge shaped guide plate 57 slides into and frictionally engages a guide socket 58 rigidly welded to the main frame 34, adjacent to the outer end thereof. This guide socket is substantially U shaped, and the legs thereof are beveled as at 59 to receive the wedge plate 57. The socket 58 also includes a bottom plate 60 and this plate carries the forwardly extending guide track 61, on which the wedge plate 57 rides. The wedge plate 50 also carries a depending U bolt 62 which slidably receives the track 61. The outer end of the track carries a stop 63 for limiting the rearward sliding of the track on the wedge plate 57.

Figures 3, 4, 5:
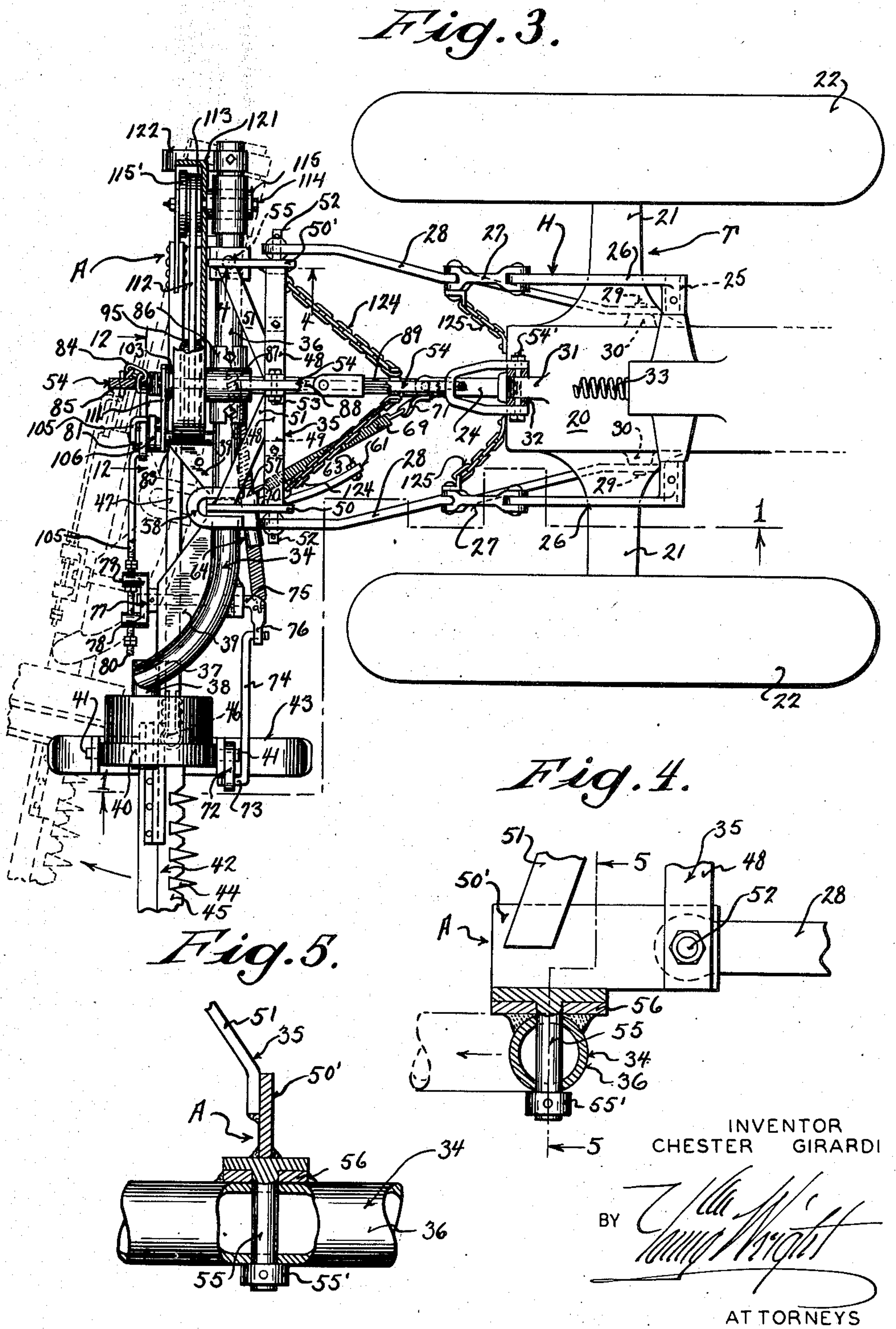
Figure 3 is a horizontal, sectional view taken on the line 3—3 of Figure 1, looking in the direction of the arrows.
Figure 4 is a fragmentary, transverse, sectional view taken on the line 4—4 of Figure 3, looking in the direction of the arrows, illustrating the pivot support for the main frame, whereby the same can swing rearwardly in a horizontal plane when the cutter bar strikes a solid object.
Figure 5 is a fragmentary, detail, sectional view taken on the line 5—5 of Figure 4, looking in the direction of the arrows, showing the pivot.
Figures 6, 7:
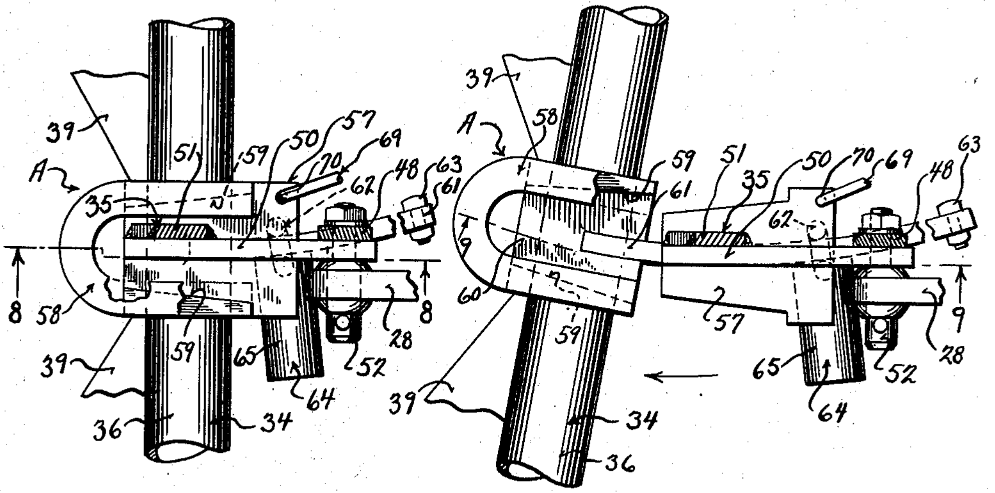
Figure 6 is a fragmentary, detail, horizontal, sectional view taken on the line 6—6 of Figure 1, looking in the direction of the arrows, illustrating the novel guide and spring ball release for the main frame.
Figure 7 is a view similar to Figure 6, but showing the main frame swung back on the guide.
Figures 8, 9, 10, 11:
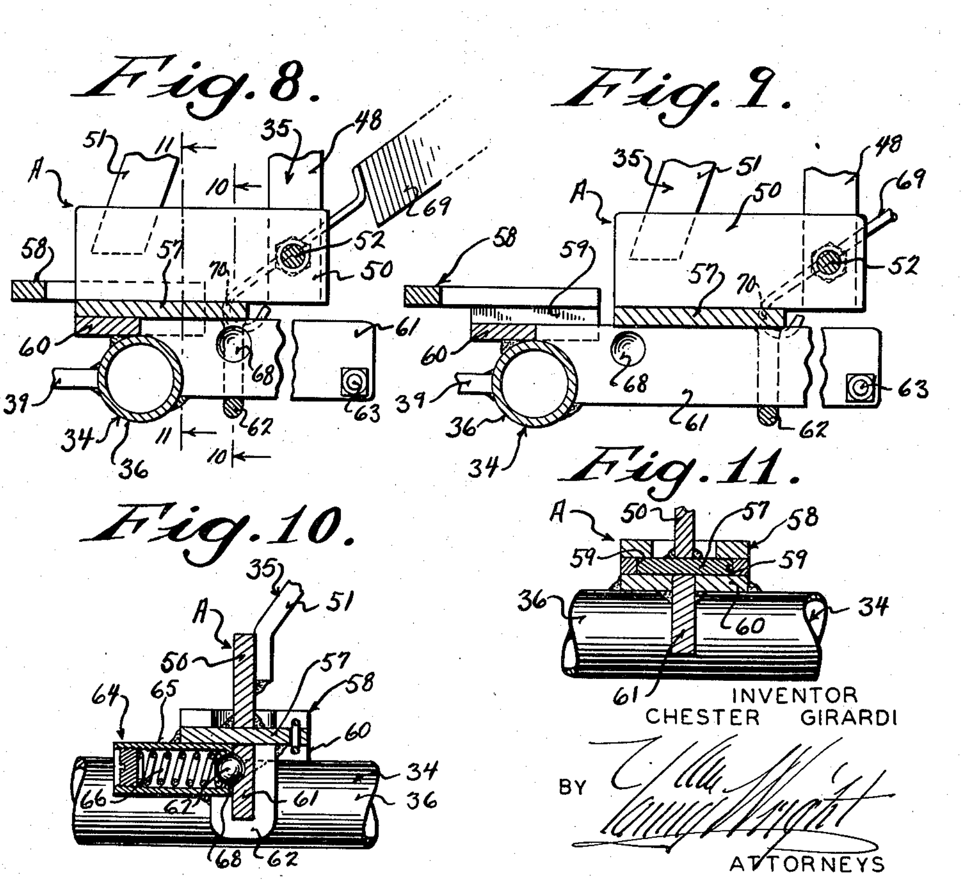
Figure 8 is a fragmentary, detail, vertical, sectional view, taken on the line 8—8 of Figure 6, showing the novel guide.
Figure 9 is a similar view but taken on the line 9—9 of Figure 7 looking in the direction of the arrows.
Figure 10 is a fragmentary, transverse, sectional view through the guide and spring ball release taken on the line 10—10 of Figure 8, looking in the direction of the arrows.
Figure 11 is a transverse, sectional view through the guide, taken on the line 11—11 of Figure 8, looking in the direction of the arrows.
Figure 12:
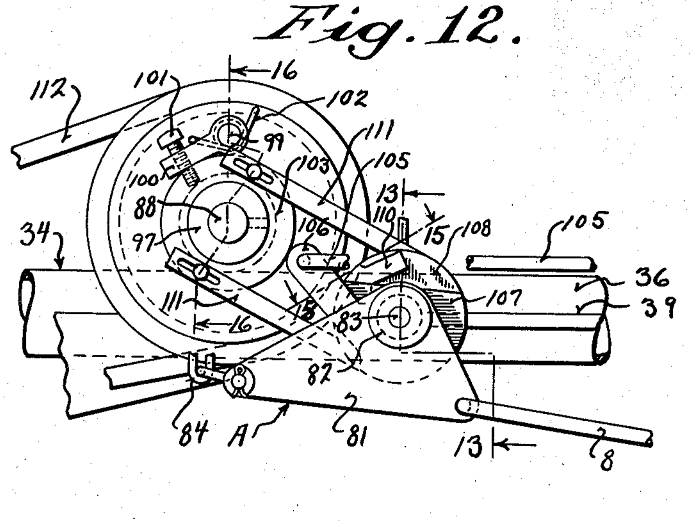
Figure 12 is a fragmentary, detail, sectional view, taken on the line 12—12 of Figure 3, looking in the direction of the arrows illustrating a part of the main frame and the clutch for the drive.
Figure 13:
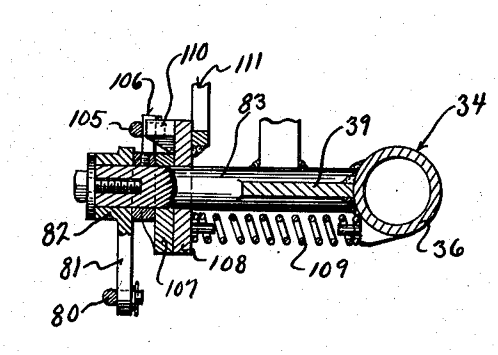
Figure 13 is a transverse, sectional view through the main frame and a part of the mechanism for actuating the clutch and other parts, taken on line 13—13 of Figure 12, looking in the direction of the arrows.
Figure 14:
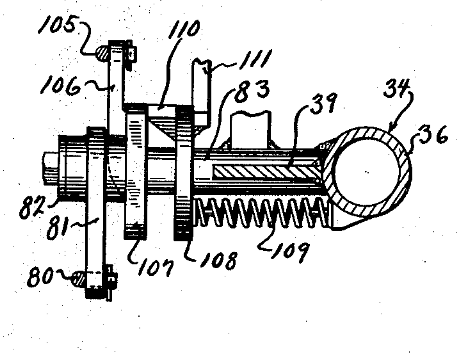
Figure 14 is a view similar to Figure 13, but showing the means for throwing out the clutch in its operative, actuated position.
Figure 15:
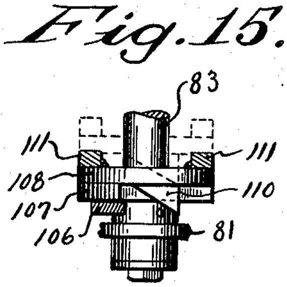
Figure 15 is a detail, fragmentary, sectional view through a part of the clutch operating means, taken on the line 15—15 of Figure 12, looking in the direction of the arrows.
Figure 16:
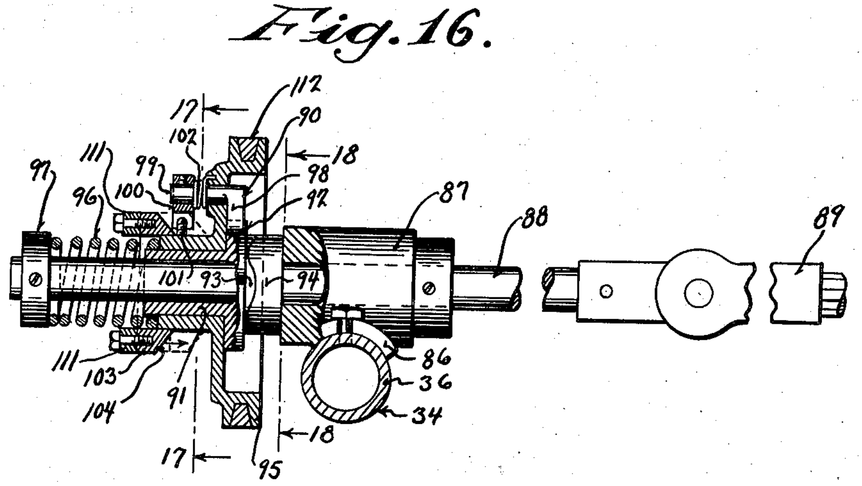
Figure 16 is a detail, fragmentary, sectional view, taken on the line 16—16 of Figure 12, illustrating the novel clutch for the drive.
Figure 17:
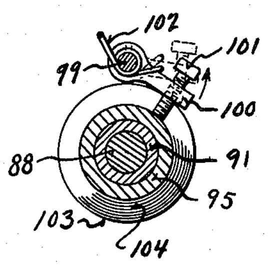
Figure 17 is a detail, sectional view through the clutch taken on the line 17—17 of Figure 16, looking in the direction of the arrows.
Figure 18:
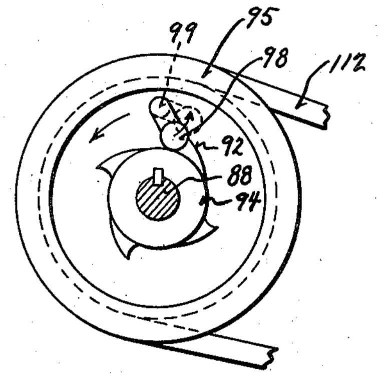
Figure 18 is a detail, sectional view through the clutch taken on the line 18—18 of Figure 16, looking in the direction of the arrows.

As shown in full lines in Figure 3, the socket 58 normally receives the wedge plate 57 (also see Figure 6). When the mower bar strikes a solid object the main frame 34 swings on the pivot bar 55 and the socket 58 rides away from the wedge plate 57. While there is a frictional engagement between the wedge plate 57 and its socket 58, a spring loaded ball release is also provided between the main frame and the frame plate 50 of the A frame 35. This spring loaded ball release is generally indicated by the reference character 64 and is best shown in Figure 10 of the drawings. As shown, this release includes a sleeve 65 secured to the wedge plate 57. Housed within the sleeve 65 is an expansion spring 66, which normally urges a ball or latch head 67 toward the guide track 61. The guide track 61 has formed in one face thereof a keeper socket 68 and when the wedge plate 57 is seated in the socket plate 58 the ball 67 will be in its keeper socket 68. Hence the main frame 34 and the mower bar will normally be held in their operative position until the mower strikes an object which will overcome the frictional engagement of the wedge plate 57 with its socket, and the seating of the ball or latch head 67 in its socket 68.

A relatively heavy contractile coil spring 69 is employed for facilitating the raising of the main frame 34 and for facilitating the floating action of the main frame and mower or cutter bar 42. The lower end of the spring 69 is connected as at 70 to the wedge plate 57 and the upper end of the spring is secured to a depending bar 71 carried by the lever 54 adjacent to the central lug 31 on the tractor. This bar 71 can be adjustably associated with the lever 54 if such should be desired and braced in any suitable way.

From the description so far it can be seen that when the shaft 25 of the hitch H is operated by the hydraulic mechanism to raise the lift levers 26, that the draw bars 28 will be raised. The lifting of the draw bars 28 will elevate the main frame 34 and the mower bar and the spring 69 will pull up on the main frame and facilitate the complete raising thereof to the desired height (see dotted line position in Figure 1).

Upon the raising of the main frame 34 and the mower bar, automatic means is provided for swinging the mower bar 42 to a raised, tilted position on the pivot pins 41. One of the pivot pins 41 is provided with a lift crank 72 and this lift crank in turn has rockably connected to its upper end, by means of a pivot pin 73, a pull link 74. Rockably mounted on the main frame 34 is a shaft 75. A suitable bearing is carried by the main frame for supporting this shaft. The forward end of the shaft has formed thereon or secured thereto a crank arm 76 and the link 74 is pivotally connected to the crank arm 76.

The rear end of the rock shaft 75 has a keyed, or otherwise rigidly secured thereto, double armed operating lever 77. This lever 77 includes a lower arm 78 and an upper arm 79. The lower arm 78 has pivotally connected thereto a pull rod 80 and this rod in turn is pivotally connected to a bell crank 81. The bell crank 81 is mounted for swinging movement, as at 82 on a stub shaft 83, which extends rearwardly from the main frame 34. This stub shaft is securely welded to the straight portion 36 of the main frame and to adjacent reinforcing webs 39. Also pivotally connected to the bell crank is a lift chain 84 and this lift chain is connected at its upper end to the downwardly curved portion 85 of the lever 54. It is to be noted that the curved portion 85 of the lever 54 is arranged above the main frame, but extends downwardly toward the main frame.

Upon the lifting of the main frame by the draw bars 28 the A frame 35 will be carried upwardly therewith and as this lever 54 is rockably mounted intermediate its ends to the A frame, said lever will be pushed upwardly on a relatively wide swinging arc. The upward swinging movement of the lever will exert a pull on the chain 84 completing the rocking of the bell crank 81. This in turn will exert a pull on the rod 80 causing the rocking of the shaft 75. The rocking of the shaft 75 will in turn exert a pull on the rod 74 operating the crank 72 to swing up the mower bar 42.

One of the essential features of the invention is to provide a friction clutch for allowing the slipping of the drive when the cutter bar engages a solid object and to completely disconnect the drive when the main frame is elevated and when the mower bar 42 is raised to an inoperative, angular position.

Referring more particularly to Figures 12 to 18, inclusive, it can be seen that the straight portion 36 of the main frame 34 has connected thereto by flanges 86, a bearing 87 for rotatably supporting the main drive shaft 88. This main drive shaft 88 is connected, by means of a flexible shaft 89 with the power take off shaft 24 of the tractor. The shaft 89 can be of the type, as shown, embodying universal joints, so that the main frame can be readily raised and lowered. Associated with the drive shaft 88 is the clutch 90. The clutch 90 includes a hub 91 slidably and rotatably mounted upon the drive shaft 88 and this hub has formed on its forward end a ratchet wheel 92 and a clutch section 93. Keyed, or otherwise rigidly secured to the shaft 88, is a clutch section 94. The clutch sections 93 and 94 are in driving engagement at all times under normal conditions. Rotatably mounted upon the hub 91 is a pulley wheel 95 and this pulley wheel engages against the ratchet wheel 92. An expansion spring 96 is coiled about the shaft 88 and engages at one end a stop collar 97 and at its opposite end against the pulley wheel. Hence the spring normally urges the clutch section 93 through the pulley wheel 95 into engagement with the clutch section 94. In the form of the invention shown in Figures 12 to 18, there is a ratchet connection between the pulley wheel 95 and the hub 91 and the ratchet wheel 92 forms a part of this connection. Rockably mounted in the pulley wheel 95 is a dog 98 for engaging the teeth of the ratchet wheel. This dog is carried by a shaft 99 which extends through the body plate of the pulley wheel. This shaft also has secured thereto a crank arm 100. Carried by the outer end of the crank arm 100 is an adjustable finger 101. A spring 102, coiled about the shaft 99, normally urges the finger 101 to engage the sleeve portion of the pulley wheel and the dog 98 to engage the teeth of the ratchet wheel 92. Slidably mounted upon the sleeve of the pulley wheel is a push ring 103, and this ring moves on the sleeve of the pulley wheel toward and away from the body plate thereof and the finger 101. The forward edge of the push ring 103 is beveled as at 104, so that when the push ring is moved toward the body plate of the pulley wheel the finger 101 will ride up on the beveled surface of the push ring and turn the shaft 99 for lifting the dog 98 from out of operative engagement with the ratchet wheel 92.

The push ring 103 is automatically operated upon the swinging of the mower bar 42 and this is accomplished by means of a pull rod 105 which is operatively connected to the upper arm 79 of the double armed lever 77, employed in the mechanism for automatically swinging the mower bar 42 upon the lifting of the main frame. The inner end of the pull rod 105 is pivotally and operatively connected to the outer end of an arm 106, which is rigidly carried by a cam plate 107 rotatably mounted upon the stub shaft 83 which carries the bell crank 81. Slidably, but non-rotatably, mounted upon the stub shaft 83 is an operating disc 108. A coil spring is employed, as at 109, for normally urging the operating disc 108 into facial engagement with the cam 107. One face of the disc 108 has secured thereto a wedge shaped cam lug 110 which normally over-lies the lower point of the cam 107. When the cam 107 is turned, the high point of the cam riding against the inclined face of the wedge shaped cam lug 110 will force the disc 108 forwardly and away from the cam 107. This disc has rigidly secured thereto a pair of legs 111 and these legs are in turn adjustable, but rigidly fastened to the push ring 103. Consequently, it can be seen that when the disc 108 is pushed forwardly the ring 103 will be carried therewith for operating the dog 98 so that the same will be moved out of driving engagement with the ratchet wheel.

Upon the raising of the main frame and the upward swinging of the mower bar 42 through the medium of the double armed crank 77, the cam 107 will be turned for sliding the disc 108 forwardly as fully described above. Hence, it can be seen that when the mower bar is tilted, that drive to the pulley wheel 95 is interrupted.

The pulley wheel 95, through the medium of a pulley belt 112 drives a pulley wheel 113 rotatably mounted upon a stub shaft 114 carried by a bearing sleeve 115, rigidly secured to the straight portion 36 of the frame 34 adjacent to its inner end. This pulley wheel 113 has secured thereto or formed thereon a crank wheel 115'. The pitman rod 47 for the mower bar is operatively connected to this crank wheel.

Hence, it can be seen that a simple but efficient drive is provided for the mower bar which embodies the clutch 90.

When a solid object is engaged by the teeth of the mower bar, the clutch section is allowed to slip in view of the fact that the section 93 of the clutch can move back against tension of the spring 96.

Figure 19:
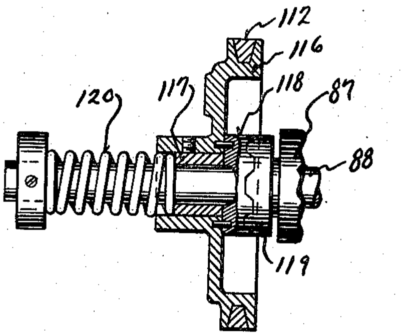
Figure 19 is a detail, longitudinal, sectional view through a slightly modified form of clutch.

In some instances, it may be desirable to rely solely upon the friction clutch and to eliminate the means for automatically disconnecting the drive to the pulley wheel 95 upon the swinging movement of the mower bar. In Figure 19, I have illustrated this type of clutch. As shown in Figure 19, a pulley wheel 116 is keyed to a hub 117 rotatably and slidably mounted upon the drive shaft 88. Also secured to the pulley wheel 116 is a friction clutch section 118 which under normal conditions engages a drive clutch section 119, which is keyed or otherwise secured to the shaft 88. An expansion spring 120 coiled about the shaft 88 is employed for normally urging the clutch section 118 into driving engagement with the section 119. The pulley wheel 116 corresponds to the pulley wheel 95. Consequently, when an obstruction is met by the mower bar, the clutch section 118 and the pull wheel 116 can move rearwardly against the tension of the spring 120 so as to allow rotation of the clutch section 119 without rotation of the clutch section 118.

Obviously, the improved mower attachment A can be provided with necessary adjuncts, such as a shield 121 for the pulley wheels 95 and 113 and the pulley belt 112.

The extreme inner end of the main frame 34 carries a combination supporting leg and guard 122. This leg depends from the frame and extends below the shield 121. When the attachment is disconnected from the mower, the leg forms in conjunction with the shoe 43 a support for the frame and prevents damage to the shield 121 by coming into contact with the ground.

The mower bar 42 can be swung to a complete raised right-angular position relative to the frame 34, if so desired, (see dotted line showing in Figure 2), and can be held in this position by means of a removable tie rod 123. This tie rod can be secured to the mower bar and to an appropriate part of the main frame.

Figure 2:
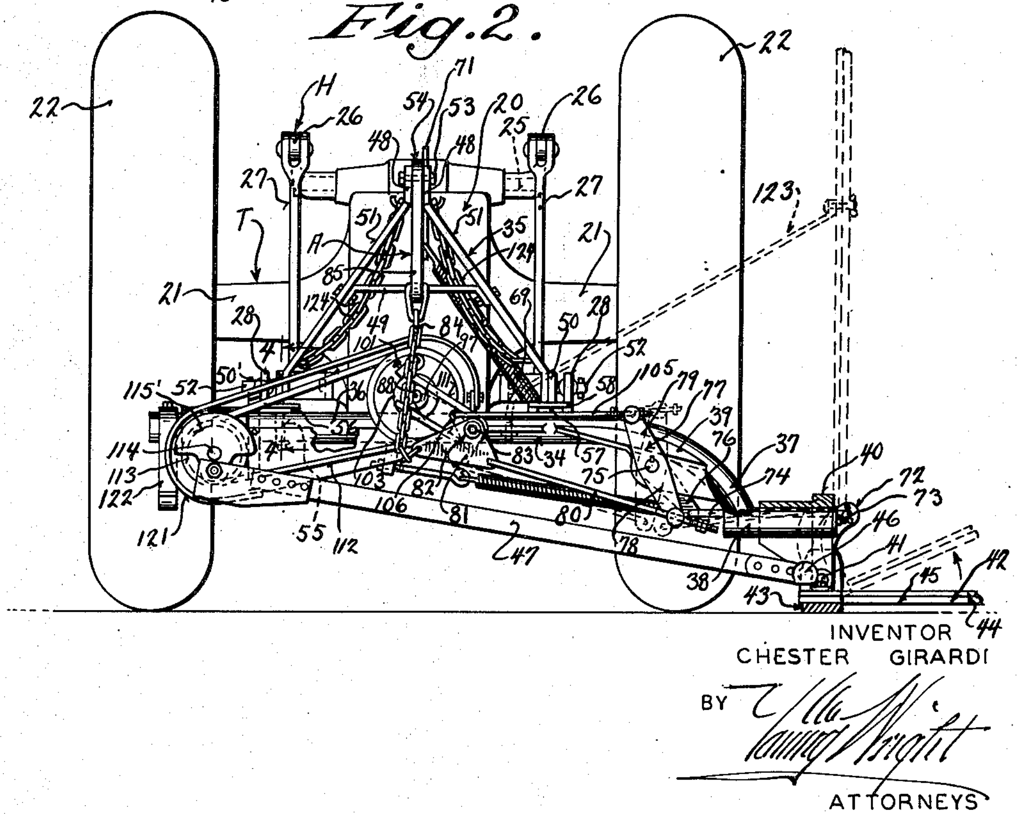
Figure 2 is a rear elevational view of the mower attachment, showing the same connected to a tractor, parts of the figure being shown broken away and in section, the parts in section being taken substantially on the line 2—2 of Figure 1, looking in the direction of the arrows.

In order to prevent swaying of the frame, I can provide stabilizing chains. As best shown in Figures 1, 2 and 3, chains 124 can be secured to the lever 54 and these chains in turn diverge outwardly and are secured to the legs 48 of the A frame 35, adjacent to their lower ends. Similar chains 125 can be secured to the tractor adjacent to the power take off and these chains diverge outwardly and are secured to the lower ends of the lift links 27 of the hitch at their points of connection with the draw bars 28. It is to be noted that the chains 125 always stay in position on the tractor hitch and that the chains 124 always stay on the attachment A. Hence, the chains 124 and 125 do not have to be disconnected when the mower attachment A is removed from the tractor T and its hitch H.

Changes in details may be made without departing from the spirit or the scope of this invention, but what I claim as new is:

1. The combination with a tractor having an implement hitch including swinging draw bars and means for raising and lowering the draw bars, of a mower attachment for the tractor including a frame extending transversely of the tractor, means rockably connecting the frame to the draw bars for raising and lowering movement therewith, said frame being adapted to swing in a horizontal plane independent of the draw bars, a mower bar hingedly carried by one end of the frame for vertical swinging movement thereon, means for automatically swinging the mower bar to an inoperative angular position upon the raising and lowering of the frame including a double armed lever rockably mounted intermediate its ends on the frame, means operatively connecting the lever with the mower bar, a bell crank, means operatively connecting one arm of the two armed lever to the bell crank, a lift lever rockably mounted on the tractor above the frame and extending over said frame, means connecting the frame to the lever intermediate the ends of the lever, means operatively connecting the extreme outer end of the lever to the bell crank, a rotatable cam on said frame, means operatively connecting the cam to the other arm of the two armed lever, means for operating the mower bar including a clutch and a drive shaft, said clutch having means for automatically disengaging the drive to the mower bar when the mower bar swings in a horizontal plane with said frame or in a vertical plane independent of said frame including a hub movable with the drive shaft having a ratchet wheel, a driven member rotatably mounted on the hub, a dog carried by the driven member normally engaging the ratchet wheel, a finger movable with a dog, a push ring slidable longitudinally of the shaft having a beveled face for movement toward and under the finger and away from the finger, a disc slidable on the frame having a cam lug normally engaging a low part of the cam and arms connecting the disc with the push ring whereby upon movement of the disc under influence of the cam said ring will be actuated.

2. The combination with a tractor having an implement hitch including swinging draw bars, means for raising and lowering the draw bars, and an attaching member above said draw bars, of a mower attachment for the tractor including a main frame extending transversely across the tractor in rear thereof including a substantially straight body portion, a downturned portion on one end thereof and an outwardly extending tubular supporting arm, a supporting yoke rigidly secured to the supporting arm, a mower bar hingedly connected directly to the arms of the yoke, said yoke having a depending ground engaging shoe, means rockably connecting the main frame to the draw bars and to the attaching member above said draw bars, whereby the main frame may swing in a horizontal plane independently of the draw bars and attaching member and the mower bar may swing in a vertical plane independently of the main frame, means for automatically swinging the mower bar to an inoperative angular position upon the raising and lowering of the frame, means for operating the mower bar including a clutch and a drive shaft, said clutch including means for automatically disengaging the drive to the mower bar when the mower bar swings in a horizontal plane with said frame or in a vertical plane independently of said frame, and a depending leg on the main frame secured to the end opposite the ground engaging shoe and terminating substantially even with the tubular supporting arm, whereby the entire frame will be held above the ground when the mower attachment is disconnected from the tractor.

CHESTER GIRARDI.

REFERENCES CITED

The following references are of record in the file of this patent:

UNITED STATES PATENTS

| Number | Name | Date |
|---|---|---|
| 1,955,544 | Huddle | Apr. 17, 1934 |
| 1,973,993 | Pearson | Sept. 18, 1934 |
| 2,155,716 | Korsmo et al. | Apr. 25, 1939 |
| 2,214,162 | Clapper | Sept. 10, 1940 |
| 2,277,844 | Clapper | Mar. 31, 1942 |
| 2,335,510 | Hansen | Nov. 30, 1943 |
| 2,502,805 | Spurlin | Apr. 4, 1950 |